(12) United States Patent
Wang et al.

(10) Patent No.: US 9,350,643 B2
(45) Date of Patent: May 24, 2016

(54) METHODS AND SYSTEMS FOR ROUTING SELECTION BASED ON ROUTING DISTANCE AND CAPACITY

(71) Applicants: Mengjiao Wang, Shanghai (CN); Yu Cheng, Shanghai (CN); Wen-Syan Li, Fremont, CA (US)

(72) Inventors: Mengjiao Wang, Shanghai (CN); Yu Cheng, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 133 days.

(21) Appl. No.: 14/052,557

(22) Filed: Oct. 11, 2013

(65) Prior Publication Data

US 2015/0063123 A1    Mar. 5, 2015

(30) Foreign Application Priority Data

Aug. 28, 2013    (CN) .......................... 2013 1 0381499

(51) Int. Cl.
*H04L 12/729* (2013.01)
*H04L 12/751* (2013.01)

(52) U.S. Cl.
CPC ............... *H04L 45/125* (2013.01); *H04L 45/02* (2013.01)

(58) Field of Classification Search
None
See application file for complete search history.

(56) References Cited

U.S. PATENT DOCUMENTS

| | | | | |
|---|---|---|---|---|
| 5,938,720 A | * | 8/1999 | Tamai ........................... | 701/533 |
| 2007/0021877 A1 | * | 1/2007 | McDonough et al. ............ | 701/1 |
| 2010/0329120 A1 | * | 12/2010 | Zhang et al. .................. | 370/238 |
| 2011/0206374 A1 | * | 8/2011 | Wang et al. ..................... | 398/59 |
| 2014/0269691 A1 | * | 9/2014 | Xue et al. ....................... | 370/389 |

OTHER PUBLICATIONS

Armacost: Composite Variable Formulations for Express Shipment Service Network Design,Transportation Science © 2002 INFORMS vol. 36, No. 1, Feb. 2002 pp. 1-20.*

* cited by examiner

*Primary Examiner* — Hoon J Chung
*Assistant Examiner* — Zhensheng Zhang
(74) *Attorney, Agent, or Firm* — Schwegman Lundberg & Woessner, P.A.

(57) ABSTRACT

A system, computer-readable storage medium storing at least one program, and computer-implemented method for route selection based on payload delivery capacity and routing distance are described. Network demand information is obtained. The network demand information may include a network graph and information related to an outbound demand of each node of the network graph. A simplified demand graph based on the outbound demand of each node and a distance between each node pair is generated. A plurality of return routes for the simplified network graph is generated and a payload delivery capacity of each of the routes is calculated. An advised return route from the plurality of return routes is generated based in part on the payload delivery capacities of the plurality of return routes.

19 Claims, 5 Drawing Sheets

METHODS AND SYSTEMS FOR ROUTING SELECTION BASED ON ROUTING DISTANCE AND CAPACITY

CLAIM OF PRIORITY

The present patent application claims the priority benefit of the filing date of Chinese Application (SIPO) No. 2013103814990 filed Aug. 28, 2013, the entire content of which is incorporated herein by reference.

TECHNICAL FIELD

Example embodiments of the present application generally relate to data processing and, more particularly, to routing selection in a networked system.

BACKGROUND

Routing is the process of selecting paths in a network for the purpose of directing network traffic along such paths. Routing may be performed for a variety of network types including, for example, electronic data exchange networks, telephone networks, and transportation networks. The goal of routing is to identify optimal paths through a network that fulfill network demands while minimizing costs and maximizing network efficiency. When the number of nodes in a given network is too large, finding global optimal solutions for these paths may be difficult, and in some instances it may be impossible.

Traditionally, these optimal paths were merely approximated using a variety of approximating techniques (e.g., genetic algorithm, ant colony algorithm, simulated annealing, etc.). However, these existing methods are computationally expensive because they must be repeatedly executed to achieve the approximation. Further, these approximations converge very slowly on the solution, and these existing methods often assume that the demands of the network are static. As a result, these existing solutions often fail to fulfill the ever-changing demands of a network.

BRIEF DESCRIPTION OF THE DRAWINGS

Some embodiments are illustrated by way of example and not limitation in the figures of the accompanying drawings.

DETAILED DESCRIPTION

Figure 1:
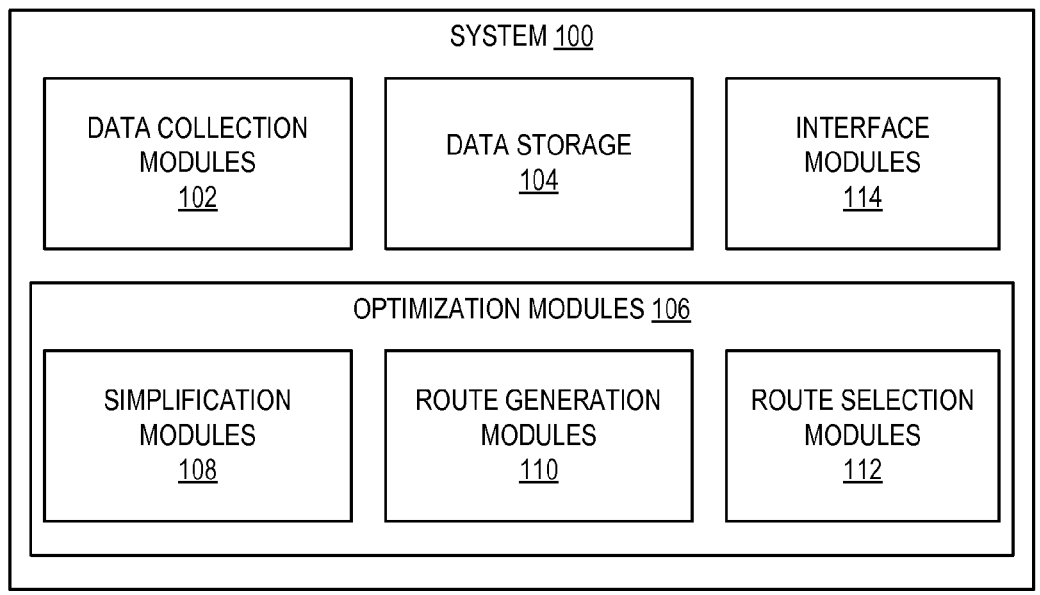
FIG. 1 is a block diagram of an example system for routing selection, according to an example embodiment.

Reference will now be made in detail to specific example embodiments for carrying out the inventive subject matter. Examples of these specific embodiments are illustrated in the accompanying drawings. It will be understood that it is not intended to limit the scope of the claims to the described embodiments. On the contrary, it is intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope of the concepts disclosed herein. Embodiments may also be tangibly embodied as a set of computer instructions stored on a computer readable medium, such as a memory device.

Aspects of the present disclosure describe systems and methods for route selection in a network based in part on payload delivery capacities, and in some embodiments, on a routing distance. In example embodiments, the method may include obtaining network demand information, which may include a network graph and demand information. The network graph describes the structure of a network and comprises nodes and edges interconnecting the nodes. The demand information relates to an outbound demand of each node. The network may, for example, be a communication network, a transportation network, or any other type of electronic data exchange network.

Consistent with some embodiments, the method may further include generating a simplified demand graph based on the outbound demand of each node and a distance between each node pair. The simplified demand graph may comprise the nodes, the directed edges and an effective demand of each node. The method may further include generating a plurality of return routes for the simplified network graph. Each of the plurality of return routes is a path that originates and terminates at the same node and spans two or more nodes of the simplified demand graph. A payload delivery capacity and routing distance may then be calculated for each of the plurality of returning routes. For each starting node, an advised return route is selected from the plurality of return routes based in part on the payload delivery capacity of the advised return route. The return routes with the greatest payload delivery capacity will be selected as the advised return route. In cases in which two or more return routes share the greatest payload delivery capacity, the return route with the shortest routing distance will be selected. In some embodiments, the network demand information may be periodically updated. The method may be repeated upon receipt of updated network demand information.

FIG. 1 is a block diagram of an example system 100 for circular transaction path detection. As illustrated in FIG. 1, the system 100 may include data collection modules 102, data storage modules 104, optimization modules 106 and interface modules 114. The optimization modules 106 may include simplification modules 108, route generation modules 110, and route selection modules 112. In one example, the system 100 may include one or more computing systems to perform the operations associated with the data collection modules 102, data storage modules 104, optimization modules 106 and interface modules 114. Other components other than those depicted in FIG. 1 may be employed in the system 100 to aid in performing the various functions associated with the system 100 in some implementations. Such components are not depicted in FIG. 1 or described further herein to simplify and focus the following discussion. Furthermore, it will be appreciated that one or more of the various modules 102-114 may be combined into a single module, and in some embodiments, one or more modules may be omitted. Additionally, while the modules of FIG. 1 are discussed in the plural sense, it is noted that a single version of the module may be utilized.

The system 100 may provide server-side functionality, via a network (e.g., the Internet), to one or more client devices (not shown). The modules 102-114 may be hosted on dedicated or shared server machines (not shown) that are communicatively coupled to enable communications between server machines. Each of the modules 102-114 is communicatively coupled (e.g., via appropriate interfaces) to the others and to various data sources, so as to allow information to be passed between each of the modules 102-114 or so as to allow each of the modules 102-114 to share and access common data.

The data collection module(s) 102 may be configured to obtain network demand information related to one or more networked systems. The networked system may, for example, be a communication network, a computer network, a telephone network, a transportation network or any other system of interconnected or interrelated persons, groups, entities or machines. The network demand information may comprise a network graph and associated demand information. The network graph may define the structure of the network and may comprise nodes and directed edges interconnecting the nodes. Depending on the type of network, each node may represent one of the various interconnected devices, computers, telephones, locations, persons, groups, entities or machines of the network. The edges of the network graph represent the connections (e.g., cables, wires, roads, etc.) between each of the nodes. The network demand information may also include a length of each of the edges. The demand information may provide an outbound demand value for each respective node of the network. The outbound demand may relate to the payload desired from a particular node. In some embodiments, the payload may be data or a collection of data. In other embodiments, the payload may be packages, parcels or other types of cargo.

In some embodiments, the data collection modules 102 may be configured to retrieve the network demand information, via an Application Program Interface (API), from one or more third party applications hosted by a third party server (not shown). In some embodiments, the data collection modules 102 may obtain network demand information directly from a client device operated by a user or network administrator. To this end, the data collection modules 102 may work in conjunction with the interface modules 114 to generate and provide a user interface to receive the network demand information. A web client running on the client device of the user may be in communication with the system 100 via a web server hosting each of the modules 102-114.

Upon obtaining the network information, the data collection modules 102 may store the network information using data storage modules 104. The data storage modules 104 facilitate access to one or more databases and retrieve data for inclusion in the system 100. These databases may include databases both internal and external to the system 100. The modules 106-114 may furthermore access the one or more databases via the data storage modules 104.

The optimization modules 106 may provide optimized route selection functionality for one or more networks. To this end, the optimization modules 106 may include one or more simplification modules 108. The simplification modules 108 may be configured to generate a simplified network demand graph from the network demand information obtained by the data collections modules 102. The generating of the simplified network demand graph may comprise determining an effective demand for each node of the network graph. The generating of the simplified network demand graph may also be based on a transmission capacity of the edges. For example, in a transportation network the transmission capacity of an edge may be the total number of packages a delivery vehicle may hold. In another example, the transmission capacity of an edge of a communication network may be the bandwidth of the connection.

The transmission capacity of an edge may be based on a particular transmission vehicle used to transmit network traffic. The mode of transmission vehicle may vary depending on the network type and the characteristics of the elements comprising the network. For example, in communication networks the transmission vehicle may be a data packet. In transportation networks the transmission vehicle may be a delivery truck or other delivery automobile.

As illustrated in FIG. 1, the optimization modules 106 may also include one or more route generation modules 110. The route generation modules 110 may determine each possible return route to fulfill the demands of each node. Each return route begins and ends at the same node and creates a path through the network spanning at least two nodes of the network graph.

In some embodiments, the determining of the return routes may comprise applying a breadth-first search (BFS) algorithm to the simplified demand graph. To optimize the amount of computations used to determine each possible return route, certain nodes or routes may be omitted. For example, in some embodiments, nodes without an outbound demand are omitted as starting points for the possible return routes. Certain routes that exceed a distance threshold may, in some embodiments, also be omitted from the resulting determination.

As illustrated in FIG. 1, the optimization modules 106 may also include one or more route selection modules 112. The route selection modules 112 may select an advised return route for each potential starting node based on the respective payload delivery capacity of each of the possible routes. To this end, the route selection modules 112 may be configured to determine the payload delivery capacity of each of the possible routes. The payload delivery capacity refers to the total payload that may be delivered for a given route. For each potential starting node, the route selection modules 112 may select the route with the greatest payload delivery capacity as the advised return route.

In some embodiments, multiple routes may have identical payload delivery capacities. Consistent with this embodiment, the one or more route selection modules 112 may select the return route having the shortest total routing distance. To this end, the route selection modules 112 may be configured to calculate the total routing distance of each of the return routes. The total routing distance of a return route refers to the sum of lengths of each edge traversed by the return route.

The interface modules 114 may be configured to generate and present various user interfaces to facilitate the routing selection functionality discussed herein. These user interfaces may include those discussed above with respect to the obtaining of the network demand information. The interface modules 114 may also generate and provide a visualization of the network graph and/or the simplified network graph including real-time demand information and one or more of the advised return routes selected by route selection modules 112.

In some embodiments, the interface modules 114 may include one or more APIs to provide programmatic access to the system 100 to a client device utilizing a programmatic client or a third party server hosting a third party application. For example, the network graph obtained by data collection modules 102 may correspond to a third party network and the API may provide programmatic access via a programmatic interface to an application of the third party so as to enable the third party to utilize the simplified demand graph and advised route selections determined by the system 100.

Figure 2:
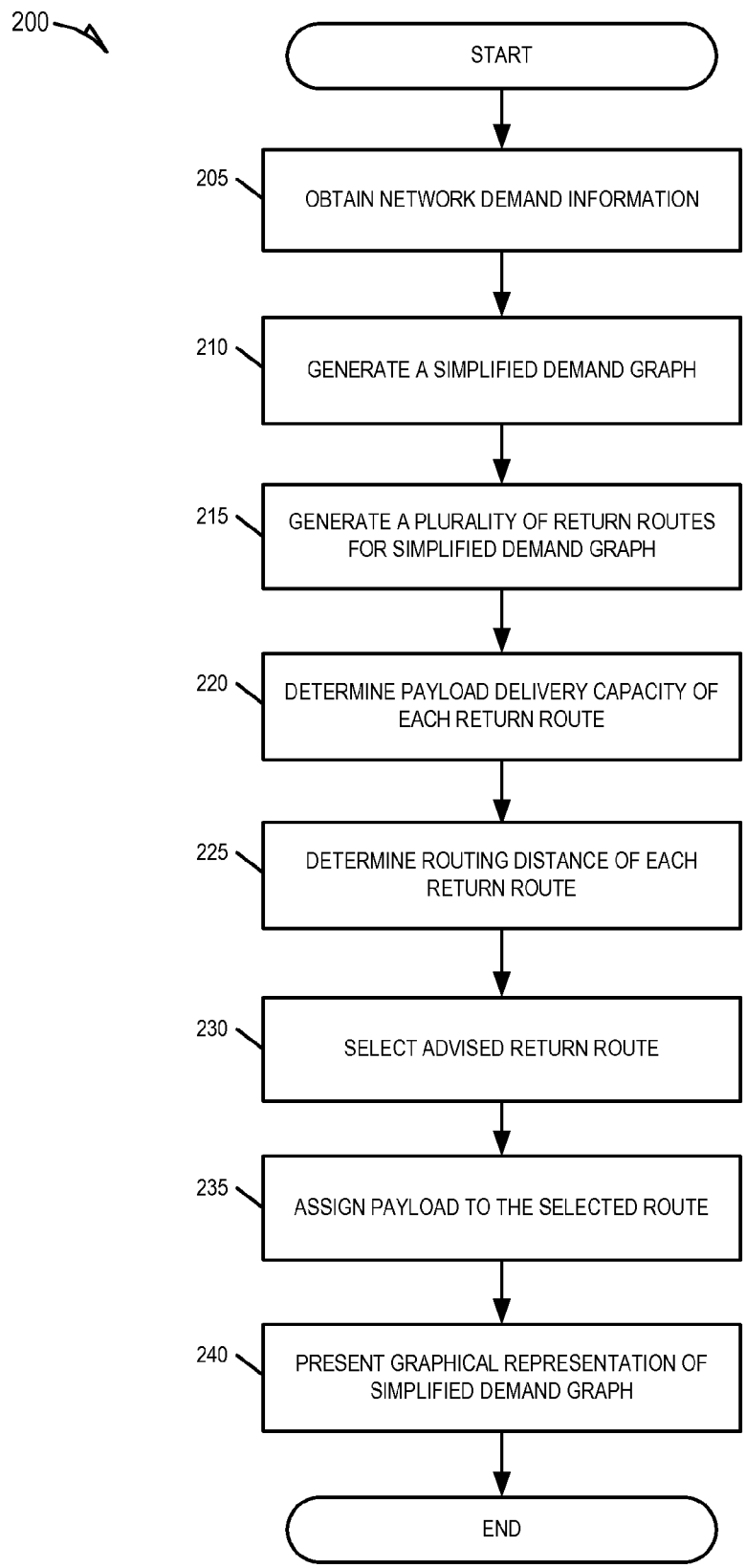
FIG. 2 is a flow diagram illustrating an example method of routing selection based on distance and capacity limitations, according to an example embodiment.

FIG. 2 is a flow diagram illustrating an example method 200 of routing selection based on distance and capacity limitations, according to an example embodiment. In this example, the method 200 may include operations such as obtaining network demand information at operation 205, generating a simplified demand graph at operation 210, generating a plurality of return routes at operation 215, determining a payload delivery capacity of each return route at operation 220, determining a routing distance of each return route at operation 225, selecting an advised return route at operation 230, assigning a particular payload to the selected route at operation 235, and presenting the simplified demand graph at operation 240.

At operation 205, network demand information is obtained. The network demand information may include a network graph comprising nodes and directed edges interconnecting the nodes. The network demand information may further include demand information defining an outbound demand of each node of the network graph. Although the demand of the network may vary with time, in some embodiments, the outbound demand of each node may be assumed to be static while performing the operations comprising the method 200.

Figure 3B:
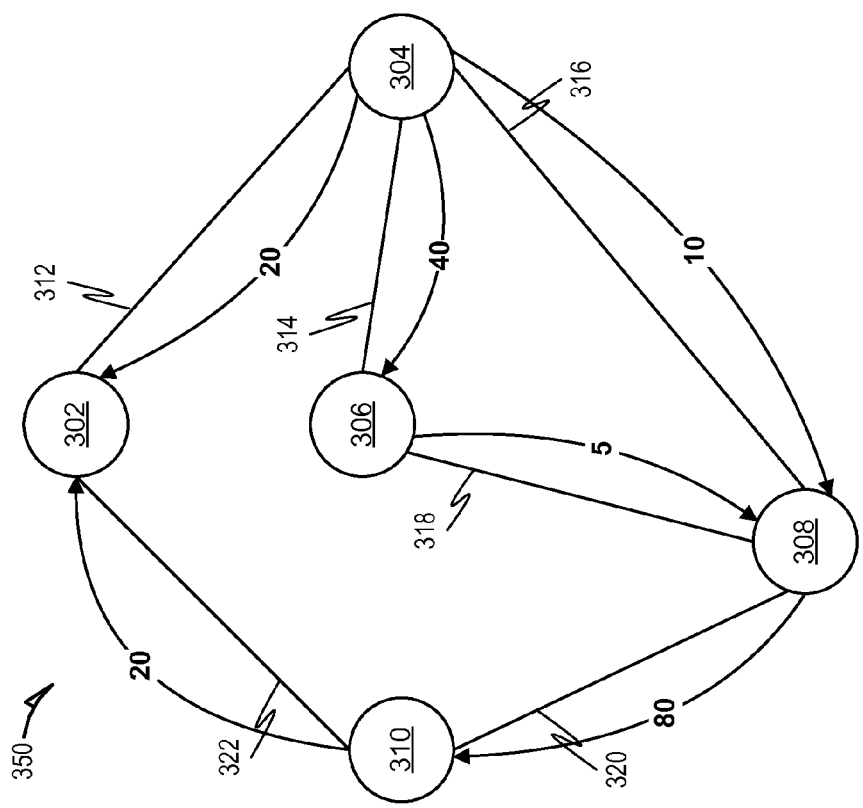
FIG. 3B is a block diagram illustrating an example simplified demand graph, according to an example embodiment.
Figure 3A:
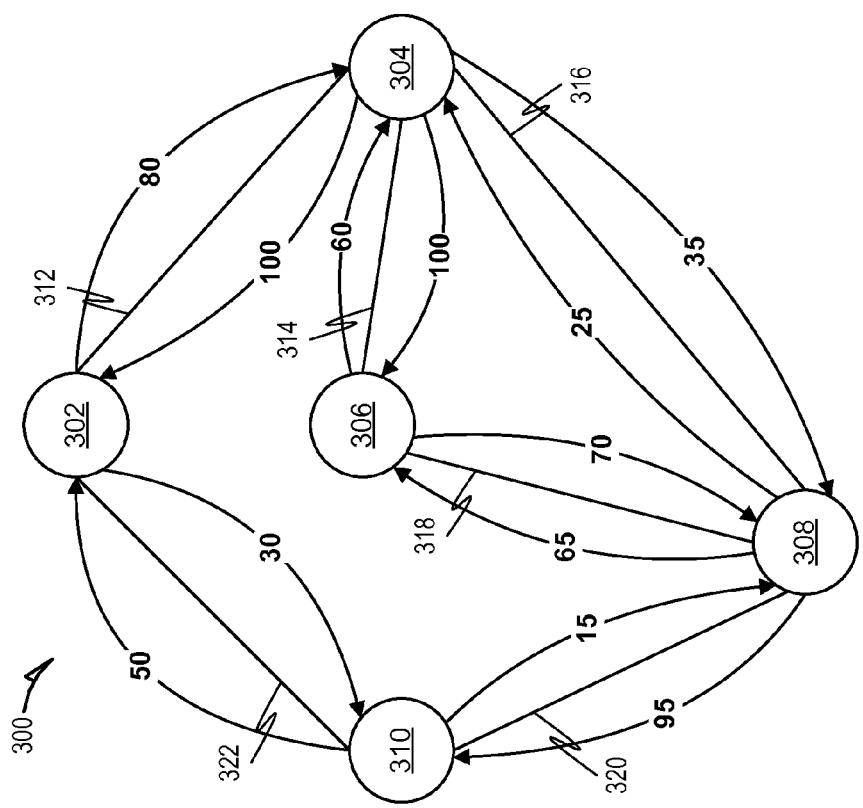
FIG. 3A is a block diagram illustrating an example network demand graph, according to an example embodiment.

FIG. 3A is a block diagram illustrating an example network graph 300 with demand information for an example network. The network graph 300 may include nodes 302-310, which are interconnected by edges 312-322, respectively. Depending on the network type, the nodes 302-310 may, for example, represent a computer, router, bridge, gateway, firewall, switch, telephone, location, person, group, entity, or any interconnected device or machine of a network. The edges 312-322 may, for example, represent the cables, wires, roads or other types of connections or relationships connecting each of the nodes 302-310. The network graph 300 also includes an indication of the outbound demands for each of the nodes 302-310, respectively, which are denoted in FIG. 3A by arrows connecting the nodes 302-310. The respective number value included with each arrow represents a weighted outbound demand for each node. The direction of the arrow of each of the outbound demands indicates the direction of the demand from between an interconnected node pair. For example, the outbound demand arrow with value "80" extending from node 302 to node 304 is the demand from node 302 to node 304. Similarly, the outbound demand arrow with value "65" extending from node 308 to node 306 represents the outbound demand from node 308 to node 306.

Returning back to FIG. 2, at operation 210 the network demand information is analyzed to generate a simplified demand graph based on the outbound demand of each node pair. The generating of the simplified demand graph may comprise determining an effective demand of each node. The effective demand of each node may be calculated by comparing the respective outbound demand of each interconnected node pair and subtracting the lowest of the two demand values from the highest of the two demand values.

The generating of the simplified demand graph may further comprise determining a total number of transmission vehicles needed to fulfill a total demand of the network. The total demand of the network may be expressed as the sum of each of the respective effective demands of each node. Each of the transmission vehicles may have a predetermined limited transmission capacity based on the capabilities and characteristics of the transmission vehicle and/or the edge type.

In some embodiments, the operation 210 may be described using the following pseudocode,

```
# Dem: original demand matrix
# Dis: distance matrix of nodes
# NewDem: simplified demand matrix
# Num_Of_Veh: number of transmission vehicles utilized in the simplification
procedure
# Max_Dis: maximum allowed routing distance
# Cap: transmission capacity
# Num_Of_Node: number of nodes in the demand graph
1.   FUNCTION [NewDem, Num_Of_Veh] = SimDemGra(Dem, Cap, Max_Dis)
2.   BEGIN
3.      Num_Of_city = Size(Dem)
4.      For i = 1:Num_Of_Node
5.         For j = 1:Num_Of_Node
         #======= Dem(i,j) denotes the delivery demand from node i to city j ======
6.            IF Dem(i,j) < Cap
7.               Continue;
8.            ELSE
         #============= get the result of simplified demand graph =============
9.               IF Dem(i,j) < Dem(j,i)
10.                  NewDem(i,j) = min(Dem(i,j),Dem(j,i)) % Cap
                     NewDem(j,i) = Dem(j,i)-Dem(i,j)+NewDem(i,j)
11.               ELSE
12.                  NewDem(j,i) = min(Dem(i,j),Dem(j,i)) % Cap
13.                  NewDem(i,j) = Dem(j,i)-Dem(i,j)+NewDem(j,i)
14.               ENDIF
         #====== get the number of transmission vehicles are needed =============
15.               Times_need = 2*Floor(min(Dem(i,j),Dem(j,i)) / Cap)
16.               Times_cap = Floor(Max_Dis / Dis(i,j))
17.               IF Times_need < Times_cap
18.                  Num_Of_Veh = 1
```

-continued

```
19.        ELSE
20.           IF Times_cap is odd
21.              Times_cap = Times_cap − 1
22.           ENDIF
23.           Num_Of_Veh = Floor(Times_need / Times_cap)
24.           NewDem(i,j) = NewDem(i,j) + Cap*(Times_need % Times_cap)/2
25.           NewDem(j,i) = NewDem(j,i) + Cap*(Times_need % Times_cap)/2
26.        ENDIF
27.     ENDIF
28.   ENDFOR
29. ENDFOR
END
```

FIG. 3B is a block diagram illustrating an example simplified demand graph 350, according to an example embodiment. The simplified demand graph 350 illustrates an example result of the application of operation 210 with respect to network graph 300. As with the original network graph 300, the simplified demand graph 350 includes the nodes 302-310, which are connected by edges 312-322. The simplified demand graph 350 is also illustrated to include effective demands, which are denoted by arrows connecting each of the nodes 302-310 and having a weighted demand value. The effective demands may be calculated as discussed above with respect to operation 215. For example, the determination of effective demand of the pair of nodes 302-304 may comprise subtracting the outbound demand of 302 from the outbound demand of 304 (e.g., effective demand=100−80).

Returning again back to FIG. 2, at operation 215 a plurality of return routes are determined for each starting node of the network graph. The starting node may be any node in the network graph with an outbound demand. Each return route originates at the starting node, creates a path through the network that connects two or more nodes, and returns back to the starting node at the termination of the path. In some embodiments, the plurality of return routes may include each possible return route for a given starting node. The generating of the plurality of return routes may comprise applying a BFS algorithm on the simplified demand graph. The BFS algorithm may begin at a starting node (e.g., a node having an outbound demand) and inspect each of the neighboring nodes sharing an edge with the starting node. For each of the neighboring nodes, the BFS algorithm may in turn identify and inspect their neighboring nodes. This process may continue until the BFS algorithm returns back to the starting node. Each path taken by the BFS algorithm may be included in the plurality of return routes. In some embodiments, the return routes included in the plurality of return routes may be limited to those return routes having a maximum and/or minimum routing distance.

In some embodiments, the operation 215 may be described using the following pseudocode,

```
    # Dis: distance matrix of nodes
    # Dem: demand matrix
    # V_start: start vertex in the graph
    # Max_Dis: maximum routing distance
1.  FUNCTION Route = RouGen(V_start, Dis, Dem, Max_Dis)
2.  BEGIN
3.     CREATE a null queue Route
4.     ENQUEUE V_start onto Route
5.     FOREACH V_start
6.        V_city = all the cities except V_start
7.        Num_Of_Route = Size(Route)
8.        V_follow = FIND(Dis(V_start(i), V_city)≠ 0)
```

-continued

```
9.        n = Size(V_follow)
10.       FOR k = Num_Of_Route + 1 : Num_Of_Route + n
11.          Dis_route(k) = Dis(V_start, V_follow(k − Num_Of_Route))
12.          IF Dis_route(k) < Max_Dis
13.             Route(k) = [Route V_follow(k)]
14.          ENDIF
15.       ENDFOR
16.       IF Num_Of_route = Size(Route)
17.          Break
18.       ENDIF
19.       V_start = V_follow
20.    ENDFOREACH
21.    DELETE Route WHERE Start vertex ≠ End vertex
22. END
```

Table 1, presented below, enumerates an example of the plurality of return routes that may be calculated at operation 215 for the simplified demand graph 350.

TABLE 1

An example solution of return route generation

| Starting Node | Return Route |
|---|---|
| 302 | 302 → 304 → 306 → 308 → 310 → 302 |
| — | 302 → 304 → 308 → 310 → 302 |
| — | 302 → 304 → 302 |
| — | 302 → 310 → 308 → 306 → 304 → 302 |
| — | 302 → 310 → 308 → 304 → 302 |
| — | 302 → 310 → 302 |
| 304 | 304 → 306 → 308 → 304 → 310 → 304 |
| — | 304 → 306 → 308 → 310 → 302 → 304 |
| . . . | . . . |

At operation 220, a payload delivery capacity for each of the plurality of return routes is calculated. The payload delivery capacity refers to the total payload that may be delivered for a given return route based on the number and location of nodes in the path as well as the transmission capacity of an edge included in the route.

At operation 225, a routing distance for each of the plurality of return routes is determined. The routing distance is the total distance spanned by the path through the network. The routing distance may be determined by taking the sum of the lengths of all edges, as indicated in the network demand information, included in the route.

At operation 230, an advised return route may be selected from the plurality of return routes based on the payload delivery capacities of the plurality of return routes. An advised return route may be selected for each possible starting node based on the payload delivery capacities of each of the plurality of return routes. The return route with the greatest payload delivery capacity will be selected for each starting node. In some embodiments, the greatest payload delivery capacity may be shared by two or more return routes. Consistent with this embodiment, the return route with the least routing distance may be selected as the advised return route.

In some embodiments, the selecting of advised return routes may be described using the following pseudocode segment,

```
# Dis: distance matrix of nodes
# NewDem: simplified demand matrix
# Cap: transmission capacity
# RouSet: the returning route set
1.  FUNCTION [NewDem, Num_Of_Veh] = GreRouSel(Dis, NewDem, Cap,
    RouSet)
2.  BEGIN
3.     Num_Of_Route = Size(RouSet)
4.     Max_Payload_Cap = 0
5.     Min_Distance = MAX %The maximum integer in the system%
6.     Selected_Route = NULL
7.     For i = 1: Num_Of_Route
8.        Num_Of_Edge = Size(RouSet(i))
9.        Total_Shipment = 0
10.       Total_Distance = 0
11.          For j = 1: Num_Of_ Edge
    #================= get the shipment of the edge =============
12.             Total_Shipment = Total_Shipment + NewDem (RouSet(i)(j))
    #================= get the distance of the edge =============
13.             Total_Distance = Total_Distance + Dis(RouSet(i)(j))
14.       ENDFOR
          IF Total_Payload_Cap > Max_Payload_Cap
15.          Selected_Route = RouSet(i)
16.       ELSEIF Total_Payload_Cap = Max_Payload_Cap AND Total_Distance <
          Min_Distance
17.          Selected_Route = RouSet(i)
18.       ELSE
19.          Continue
20.       ENDIF
21.    ENDFOR
22.    Dispatch A Vehicle to: Selected_Route
23.    Change NewDem Accordingly
24. END
```

Returning to FIG. 2, at operation 235, a payload may be assigned and dispatched to each advised return route so as to fulfill the total demand of the network. At operation 240, a graphical representation of the simplified demand graph is generated and presented at a client device of a user. In some embodiments, the graphical representation of the simplified demand graph includes an indication of the effective demands and the advised return routes.

Although the operations 205-240 are illustrated in FIG. 2 as being performed sequentially, it will be appreciated that in some embodiments, one or more of the operations may be performed in parallel with one or more other operations. Furthermore, one or more of the operations 205-240 may be combined into a single operation, and in some embodiments, one or more operations may be omitted.

Figure 4:
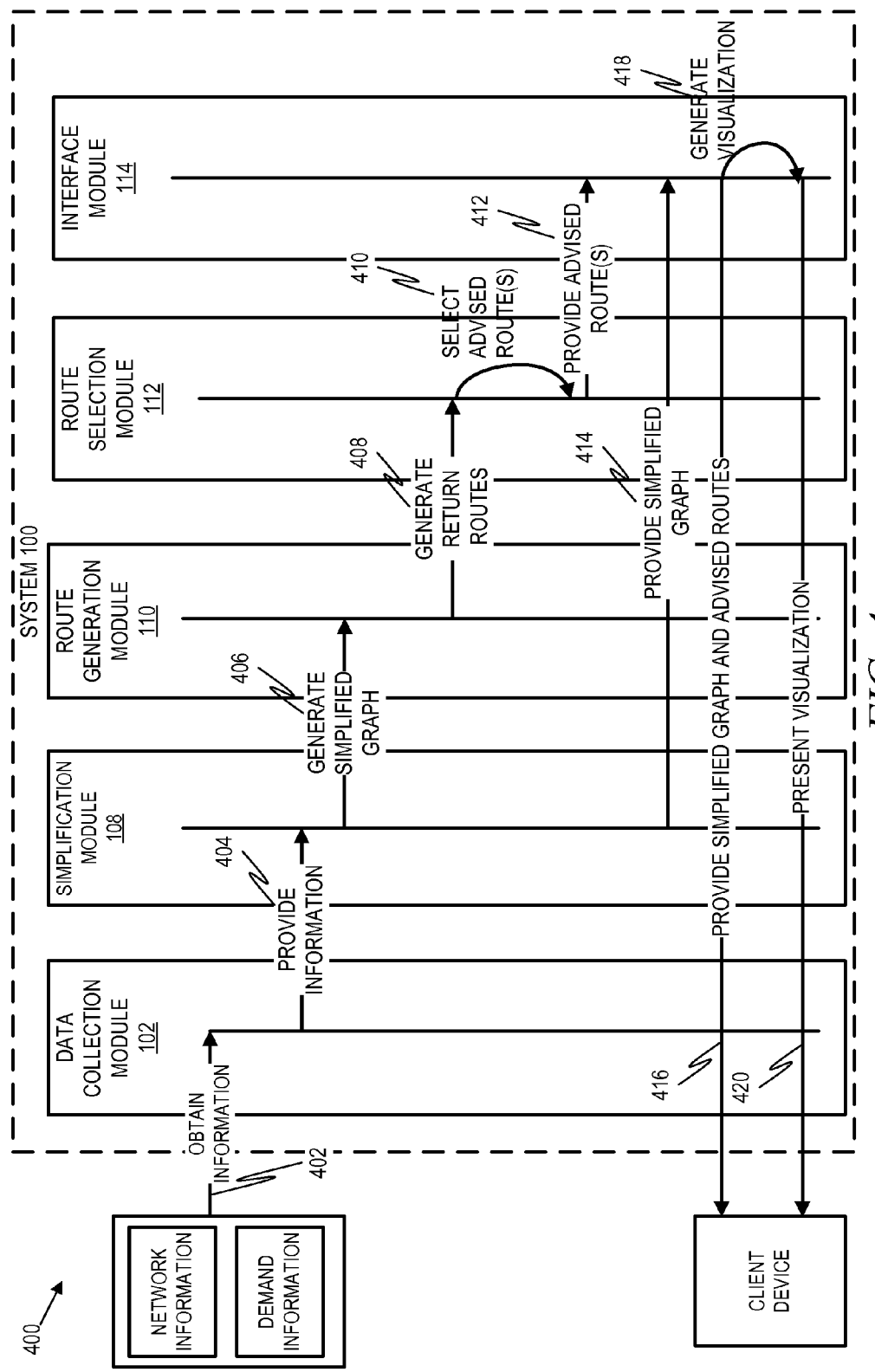
FIG. 4 is an interaction diagram illustrating an example method of routing selection based on a payload delivery capacity and routing distance, according to an example embodiment.

FIG. 4 is an interaction diagram illustrating an example method 400 of routing selection based on a payload delivery capacity and routing distance, according to an example embodiment. In particular, FIG. 4 illustrates interactions between various components of the system 100, according to an example embodiment. Specifically, FIG. 4 illustrates interactions of the data collection module 102, simplification module 108, route generation module 110, route selection module 112, and the interface module 114.

At operation 402, the data collection module 102 obtains the network demand information comprising network information (e.g., a network graph) and demand information. In some embodiments, the network demand information may be obtained from a user. In other embodiments, the network demand information may be automatically retrieved, via API, from a third party application. The network demand information is then passed to the simplification module 108 at operation 404.

At operation 406, the simplification module 108 may generate a simplified demand graph using the network demand information and provide the simplified demand graph to the route generation module 110. The generating of the simplified demand graph may comprise determining an effective demand for each node of the network as defined by the network information.

At operation 408, the route generation module 110 may generate a plurality of return routes for each starting node. The plurality of return routes may then be provided to the route selection module 112. At operation 410, the route selection module 112 may select an advised route from the plurality of return routes generated by the route generation module 110. The operation of selecting of the advised route may include calculating a payload delivery capacity and a routing distance of each the plurality of return routes. The selection of the advised return route may be based in part on the payload delivery capacities of the plurality of return routes. In some embodiments, the selection of the advised return route may also be based on the routing distance of each of the plurality of return routes. Operation 410 may be performed for each node in the network and may be reiterated until the total demand of the network has been met.

At operations 412 and 414, the advised routes and simplified demand graph may be provided to the interface module 114, respectively. At operation 416, the interface module 114 may transmit the advised routes and simplified demand graph to a client device of a user.

At operation 418, a visualization of the network is generated. The visualization may include the simplified demand graph and may illustrate each of the advised return routes. At operation 420, the interface module 114 may transmit instructions to a client device which cause the visualization to be presented at the client device. The client device may be any of a variety of types of devices (e.g., a cellular telephone, a personal digital assistant (PDA), a personal navigation device (PND), a handheld computer, a tablet computer, a desktop computer, a notebook computer, a wearable computing device, or other type of movable device). The client devices may interface with the system 100 via a connection to a communication network (e.g., the Internet or WAN).

In some embodiments, the network demand information may be periodically updated, or in some instances, the demand information is updated in real-time. The method 400 may be repeated in response to receipt of updated network demand information.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
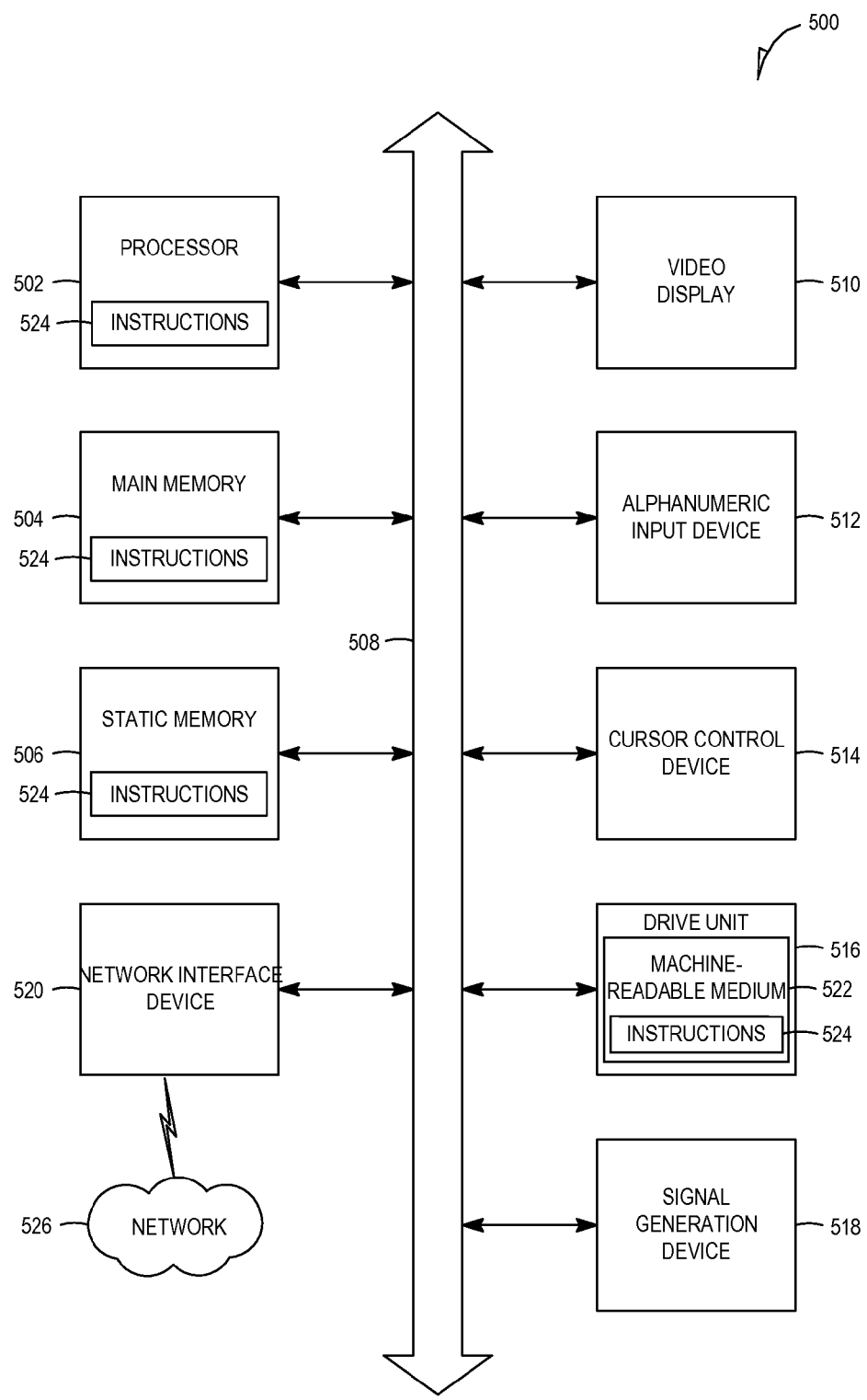
FIG. 5 is a diagrammatic representation of a machine in the example form of a computer system within which a set of instructions for causing the machine to perform any one or more of the methodologies discussed herein may be executed.

FIG. 5 is a block diagram of machine in the example form of a computer system 500 within which instructions 524 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a UI cursor control device 514 (e.g., a mouse), a disk drive unit 516, a signal generation device 518 (e.g., a speaker), and a network interface device 520.

Machine-Readable Medium

The disk drive unit 516 includes a machine-readable medium 522 on which is stored one or more sets of data structures and instructions 524 (e.g., software) embodying or used by any one or more of the methodologies or functions described herein. The instructions 524 may also reside, completely or at least partially, within the main memory 504, static memory 506, and/or within the processor 502 during execution thereof by the computer system 500, with the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more data structures or instructions 524. The term "machine-readable medium" shall also be taken to include any tangible medium or tangible device that is capable of storing, encoding, or carrying instructions (e.g., instructions 524) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a LAN, a WAN, the Internet, mobile telephone networks, POTS networks, and wireless data networks (e.g., WiFi, WiMAX, and LTE networks). The term "transmission medium" shall be taken to include any intangible medium that is capable of storing, encoding, or carrying instructions 524 for execution by the machine, and includes digital or analog communications signals or other intangible media to facilitate communication of such software.

Although the present inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
obtaining transportation network demand information of a transportation network comprising a plurality of locations and a plurality of roads, the transportation network demand information including a transportation network graph comprising nodes and edges interconnecting the nodes, each node of the transportation network graph representing a location from among the plurality of locations, each edge representing a road between locations, the transportation network demand information further including an outbound demand value of each node, the outbound demand value corresponding to a number of packages and parcels to be delivered from each location;
generating a simplified demand graph from the transportation network graph based on the outbound demand values of each node pair and a distance between each node pair, the simplified demand graph comprising the nodes, at least one of the edges and an effective demand value of each node pair, the generating of the simplified demand graph including determining the effective demand value of each node pair by determining a difference between a first outbound demand value and a second outbound demand value, the first outbound demand value corresponding to a first node of the node pair, the second outbound demand value corresponding to a second node of the node pair;
for each starting node in the simplified demand graph, determining, using one or more processors, a plurality of possible return routes using the simplified demand graph, each of the plurality of possible return routes being a path connecting the location represented by the starting node to one or more other locations using one or more roads, the path originating and terminating at the location represented by the starting node;
determining a payload delivery capacity for each possible return routes of the plurality of possible return routes for each starting node based in part on a transmission capacity of delivery vehicles used in the transportation network and a number of nodes in the possible return route;
determining a routing distance of each possible return route of the plurality of possible return routes for each starting node based on a length of roads traversed in each possible return route;
for starting each node in the simplified demand graph, selecting an advised return route from the plurality of possible return routes based on the payload delivery capacity and the routing distance of the advised return route, the selecting of the advised return route from the plurality of possible return routes including selecting a route from the plurality of possible return routes having the greatest payload delivery capacity; and
causing presentation on a client device of a graphical representation of the simplified demand graph and each of the advised return routes.

2. The method of claim 1, further comprising dispatching a package or a parcel to the advised return route.

3. The method of claim 1, wherein the causing of the presentation of the graphical representation includes transmitting a set of instructions to the client device that cause the client device to display the graphical representation of the simplified demand graph and each of the advised return routes.

4. The method of claim 1, wherein the generating of the plurality of possible return routes comprises applying a breadth-first search algorithm on the simplified demand graph to determine the plurality of possible return routes.

5. The method of claim 4, wherein the plurality of possible return routes include only those return routes having a routing distance below a predefined threshold.

6. The method of claim 4, wherein the plurality of return routes include only those return routes having a payload delivery capacity above a predefined threshold.

7. The method of claim 1, wherein the transmission capacity includes a total number of packages capable of being held by the delivery vehicle.

8. The method of claim 1, wherein the delivery vehicle is delivery truck or automobile.

9. The method of claim 8, wherein the determining the routing distance of each possible return route in the plurality of return routes includes calculating a sum of lengths of roads traversed between locations included in each possible return route.

10. The method of claim 1, wherein the advised return route originates and terminates at a first node, and further comprising determining an additional advised return route based in part on the payload delivery capacity of the additional advised return route, the additional advised route originating and terminating at a second node.

11. The method of claim 1, wherein the payload delivery capacity of two or more possible return routes of the plurality of possible return routes are equal and highest among the plurality of possible return routes;
the method further including selecting, from the two or more possible return routes, the return route with the shortest routing distance as the advised return route.

12. The method of claim 1, wherein the determining of the payload delivery capacity for each possible return routes is further based on a number of locations included in the path.

13. A non-transitory computer-readable storage medium including instructions that, when executed by at least one processor of a machine, cause the machine to perform operations comprising:
obtaining transportation network demand information of a transportation network comprising a plurality of locations and a plurality of roads, the transportation network demand information including a transportation network graph comprising nodes and edges interconnecting the nodes, each node of the transportation network graph representing a location from among the plurality of locations, each edge representing a road between locations, the transportation network demand information further including an outbound demand value of each node, the outbound demand value corresponding to a number of packages and parcels to be delivered from each location;
generating a simplified demand graph from the transportation network graph based on the outbound demand values of each node pair and a distance between each node pair, the simplified demand graph comprising the nodes, at least one of the edges and an effective demand value of each node pair, the generating of the simplified demand graph including determining the effective demand value of each node pair by determining a difference between a first outbound demand value and a second outbound demand value, the first outbound demand value corresponding to a first node of the node pair, the second outbound demand value corresponding to a second node of the node pair;
for each starting node in the simplified demand graph, determining a plurality of possible return routes using the simplified demand graph, each of the plurality of possible return routes being a path connecting the location represented by the starting node to one or more other locations using one or more roads, the path originating and terminating at the location represented by the starting node;
determining a payload delivery capacity for each possible return route of the plurality of possible return routes for each starting node based in part on a transmission capacity of delivery vehicles used in the transportation network and a number of nodes in the possible return route;
determining a routing distance of each possible return route of the plurality of possible return routes for each starting node based on a length of roads traversed in each possible return route;
for each starting node in the simplified demand graph, selecting an advised return route from the plurality of possible return routes based on the payload delivery capacity and the routing distance of the advised return route, the selecting of the advised return route from the plurality of possible return routes including selecting a route from the plurality of possible return routes having the greatest payload delivery capacity; and
causing presentation on a client device of a graphical representation of the simplified demand graph and each of the advised return routes.

14. The non-transitory computer-readable storage medium of claim 13, further including instructions that, when executed by the at least one processor of the machine, cause the machine to assign a package or a parcel to the advised return route.

15. The non-transitory computer-readable storage medium of claim 13, further including instructions that, when executed by the at least one processor of the machine, cause the machine to present a visualization of the simplified demand graph on a user interface, the presentation of the simplified demand graph including the advised return route.

16. The non-transitory computer-readable storage medium of claim 13, wherein the determining the plurality of possible return routes comprises applying a breadth-first search algorithm on the simplified demand graph to determine the plurality of possible return routes.

17. The non-transitory computer-readable storage medium of claim 13, wherein the determining the routing distance of the advised return route includes calculating a sum of lengths of roads traversed between locations included in each possible return route.

18. The non-transitory computer-readable storage medium of claim 14, wherein the package or parcel corresponds to the outbound demand of at least one location included in the advised return route.

19. A system comprising:
at least one processor of a machine;
a data collection module configured to obtain transportation network demand information of a transportation network comprising a plurality of locations and a plurality of roads, the transportation network demand information including a transportation network graph comprising nodes and edges interconnecting the nodes, each node of the transportation network graph representing a location from among the plurality of locations, each edge representing a road between locations, the transportation network demand information further including an outbound demand value of each node, the outbound demand value corresponding to a number of packages and parcels to be delivered from each location;
a demand graph simplification module to generate, using the at least one processor of the machine, a simplified demand graph from the transportation network graph based on the outbound demand values of each node pair and a distance between each node pair, the simplified demand graph comprising the nodes, at least one of the edges and an effective demand value of each node pair; the demand graph simplification module to generate the simplified demand graph by performing operations including determining the effective demand value of each node pair, the determining the effective demand value of each node pair including determining a difference between a first outbound demand value and a second outbound demand value, the first outbound demand value corresponding to a first node of the node pair, the second outbound demand value corresponding to a second node of the node pair;
a route generation module to generate, for each starting node in the simplified demand graph, a plurality of possible return routes using the simplified demand graph, each of the plurality of possible return routes being a path connecting the location represented by the starting node to one or more other locations using one or more roads, the path originating and terminating at the location represented by the starting node; and
a route selection module to determine a payload delivery capacity for each possible return route of the plurality of possible return routes for each starting node based in part on a transmission capacity of delivery vehicles used in the transportation network and a number of nodes in the possible return route, the route selection module further to select an advised return route from the plurality of possible return routes based at least in part on a payload delivery capacity and a routing distance of the advised return route, the selecting of the advised return route from the plurality of possible return routes including selecting a route from the of possible return routes having the greatest payload delivery capacity; and an interface module to cause presentation on a client device of a graphical representation of the simplified demand graph and each of the advised return routes.

* * * * *